United States Patent
Itoh et al.

(10) Patent No.: US 9,299,175 B2
(45) Date of Patent: Mar. 29, 2016

(54) GRAPH DISPLAY CONTROL DEVICE, GRAPH DISPLAY CONTROL METHOD AND GRAPH DISPLAY CONTROL PROGRAM

(71) Applicant: FUJIFILM Corporation, Tokyo (JP)

(72) Inventors: Meiji Itoh, Kanagawa-ken (JP); Yasunori Ohta, Kanagawa-ken (JP); Akira Oosawa, Kanagawa-ken (JP); Shoji Kanada, Kanagawa-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 176 days.

(21) Appl. No.: 14/033,263

(22) Filed: Sep. 20, 2013

(65) Prior Publication Data
US 2014/0092094 A1 Apr. 3, 2014

(30) Foreign Application Priority Data
Sep. 28, 2012 (JP) .................................. 2012-217670

(51) Int. Cl.
G06T 11/20 (2006.01)
(52) U.S. Cl.
CPC .................................... *G06T 11/206* (2013.01)
(58) Field of Classification Search
CPC .................................................... G06T 11/206
See application file for complete search history.

(56) References Cited

U.S. PATENT DOCUMENTS

| | | | | |
|---|---|---|---|---|
| 5,535,317 A | * | 7/1996 | Tanaka et al. | 345/440 |
| 8,104,471 B2 | * | 1/2012 | Schatzl | 128/204.21 |
| 2006/0028471 A1 | * | 2/2006 | Kincaid et al. | 345/440 |
| 2006/0211915 A1 | * | 9/2006 | Takeuchi et al. | 600/109 |
| 2009/0048867 A1 | * | 2/2009 | Soejima et al. | 705/2 |
| 2010/0074599 A1 | * | 3/2010 | Tateno et al. | 386/124 |

FOREIGN PATENT DOCUMENTS

JP 6-105812 A 4/1994
JP 7-296089 A 11/1995

* cited by examiner

*Primary Examiner* — Joni Richer
*Assistant Examiner* — Grace Q Li
(74) *Attorney, Agent, or Firm* — McGinn IP Law Group PLLC (57) ABSTRACT

A test data obtaining unit for obtaining pieces of medical test data used to generate a plurality of graphs; a reference test data specifying unit for specifying reference test data from among the pieces of medical test data; a similarity calculation unit for calculating similarity of variation of each of pieces of non-reference test data other than the reference test data to variation of the reference test data; and a display control unit for selecting pieces of non-reference test data to be separately displayed from the pieces of non-reference test data based on the similarity of each non-reference test data, displaying non-reference graphs based on the pieces of non-reference test data to be separately displayed respectively on independent coordinate axes, and displaying non-reference graphs based on the pieces of non-reference test data that are not selected to be separately displayed together on the same coordinate axes are provided.

12 Claims, 9 Drawing Sheets

ELECTRONIC MEDICAL CHART TABLE

| ELECTRONIC MEDICAL CHART ID | PATIENT ID | DISEASE NAME | DATE OF FIRST MEDICAL EXAMINATION | DATE OF HOSPITALIZATION | DATE OF DISCHARGE |
|---|---|---|---|---|---|
| 001 | 001 | DISEASE A | 2011/03/05 | NONE | NONE |
| 002 | 001 | DISEASE B | 2012/03/01 | 2012/04/02 | IN HOSPITAL |
| 003 | 002 | DISEASE A | 2012/04/04 | 2012/04/04 | 2012/07/09 |
| 044 | 003 | DISEASE C | 2010/03/02 | NONE | NONE |

FIG.7

MEDICAL TEST DATA TABLE

| ELECTRONIC MEDICAL CHART ID | PATIENT ID | DISEASE NAME |
|---|---|---|
| 002 | 001 | DISEASE B |

| DATE OF MEDICAL TEST | MEDICAL TEST ITEM | | | | | | | |
|---|---|---|---|---|---|---|---|---|
| | s | t | u | v | w | x | y | z |
| 2012/04/02 10:00 | 24 | 100 | 1.5 | 0.04 | 3.2 | 35.8 | 60.0 | 6 |
| 2012/05/31 13:00 | 39 | 150 | 1.4 | 0.03 | 3.0 | 36.2 | 62.5 | 7 |
| 2012/08/04 10:30 | 20 | 300 | 1.9 | 0.04 | 3.3 | 36.0 | 63.0 | 8 |

FIG.8

PATIENT TABLE

| PATIENT ID | PATIENT NAME |
|---|---|
| 001 | PATIENT I |

| NAME | PATIENT I |
|---|---|
| BIRTH DAY | 1977/07/07 |
| AGE | 35 |
| ADDRESS | ROPPONGI, MINATO-KU, TOKYO |
| DATE OF FIRST MEDICAL EXAMINATION | 2012/03/01 |

GRAPH DISPLAY CONTROL DEVICE, GRAPH DISPLAY CONTROL METHOD AND GRAPH DISPLAY CONTROL PROGRAM

BACKGROUND OF THE INVENTION

1. Field of the Invention

The present invention relates to a graph display control device, a graph display control method and a graph display control program for displaying a plurality of graphs based on a plurality of pieces of medical test data.

2. Description of the Related Art

In recent years, in the medical field, results of a plurality of medical tests performed on the patient are displayed during a medical examination and are used as reference information to identify the disease name, determine a therapeutic strategy, etc.

There are various types of medical tests performed on patients. In actual medical practice, when the patient is suspected to have a specific disease, diagnosis or treatment is performed with referencing test results of a plurality of medical tests that are regarded important for the diagnosis of the specific disease.

However, there may be many medical test items performed on a patient, and the number of medical test items is increased when the patient has two or more diseases. If test results of the many medical test items are plotted as graphs on the same coordinate axes, the graphs overlap one another and it is hard to see each graph.

To address this problem, Japanese Unexamined Patent Publication No. 7 (1995)-296089 (Patent Document 1), for example, proposes a method for displaying a plurality of graphs such that they do not overlap one another to display the graphs in an easily viewable manner.

Japanese Unexamined Patent Publication No. 6 (1994)-105812 (Patent Document 2) proposes displaying a plurality of graphs with shifting data of interest or data other than the data of interest upward or downward so that they do not overlap one another.

SUMMARY OF THE INVENTION

However, with the methods disclosed in Patent Documents 1 and 2 where a plurality of graphs are simply displayed such that they do not overlap one another, the graphs are just separately displayed in an unconsidered manner and this is inconvenient for judging relevance, etc., among the separately displayed graphs. Further, in the case where a plurality of graphs are separately displayed in an unconsidered manner, graphs that are not relevant to the diagnosis may be separately displayed and this may rather hinder the diagnosis.

In view of the above-described circumstances, the present invention is directed to providing a graph display control device, a graph display control method and a graph display control program for displaying many graphs in an easily viewable manner, where graphs that are particularly relevant to and necessary for diagnosis are separately displayed in an easily viewable manner.

An aspect of the graph display control device of the invention is a graph display control device including: a test data obtaining unit for obtaining pieces of medical test data used to generate a plurality of graphs; a reference test data specifying unit for specifying reference test data from among the pieces of medical test data obtained by the test data obtaining unit; a similarity calculation unit for calculating similarity of variation of each of at least three pieces of non-reference test data among the pieces of medical test data other than the reference test data to variation of the reference test data; and a display control unit for selecting a predetermined number of pieces of non-reference test data to be separately displayed from the at least three pieces of non-reference test data based on the similarity of each non-reference test data calculated by the similarity calculation unit, displaying non-reference graphs based on the pieces of non-reference test data to be separately displayed respectively on independent coordinate axes, and displaying non-reference graphs based on the pieces of non-reference test data that are not selected to be separately displayed together on the same coordinate axes.

In the graph display control device of the invention, the display control unit may preferentially select the non-reference test data having relatively high similarity as the non-reference test data to be separately displayed.

Alternatively, the display control unit may preferentially select the non-reference test data having relatively low similarity as the non-reference test data to be separately displayed.

The graph display control device may further include a display mode setting unit for setting a display mode, the display mode being switchable between a high similarity preferential display mode for preferentially selecting the non-reference test data having relatively high similarity as the non-reference test data to be separately displayed and a low similarity preferential display mode for preferentially selecting the non-reference test data having relatively low similarity as the non-reference test data to be separately displayed, wherein the display control unit may select the non-reference test data to be separately displayed based on the high similarity preferential display mode or the low similarity preferential display mode set at the display mode setting unit.

The test data obtaining unit may search for and obtain, based on a display set data structure that associates a disease with a group of medical test items, medical test data of each medical test item of the display set data structure from pieces of medical test data stored in advance.

The test data obtaining unit may obtain medical test data that is searched for based on a desired search condition from pieces of medical test data stored in advance.

The display control unit may display the non-reference graphs that are displayed together on the same coordinate axes with different levels of visibility depending on the similarity.

The test data obtaining unit may obtain the pieces of medical test data linked to an electronic medical chart.

The display control unit may display a content of the electronic medical chart.

An aspect of the graph display control method of the invention is a graph display control method including: obtaining pieces of medical test data used to generate a plurality of graphs; specifying reference test data from among the obtained pieces of medical test data; calculating similarity of variation of each of at least three pieces of non-reference test data among the pieces of medical test data other than the reference test data to variation of the reference test data; and selecting a predetermined number of pieces of non-reference test data to be separately displayed from the at least three pieces of non-reference test data based on the calculated similarity of each non-reference test data, displaying non-reference graphs based on the pieces of non-reference test data to be separately displayed respectively on independent coordinate axes, and displaying non-reference graphs based on the pieces of non-reference test data that are not selected to be separately displayed together on the same coordinate axes.

An aspect of the graph display control program of the invention is a non-transitory recording medium containing a graph display control program for causing a computer to execute the steps including: obtaining pieces of medical test data used to generate a plurality of graphs; specifying reference test data from among the obtained pieces of medical test data; calculating similarity of variation of each of at least three pieces of non-reference test data among the pieces of medical test data other than the reference test data to variation of the reference test data; and selecting a predetermined number of pieces of non-reference test data to be separately displayed from the at least three pieces of non-reference test data based on the calculated similarity of each non-reference test data, displaying non-reference graphs based on the pieces of non-reference test data to be separately displayed respectively on independent coordinate axes, and displaying non-reference graphs based on the pieces of non-reference test data that are not selected to be separately displayed together on the same coordinate axes.

According to the graph display control device, method and program of the invention, similarity of variation of each of pieces of non-reference test data to variation of the reference test data is calculated, pieces of non-reference test data to be separately displayed are selected from at least three pieces of non-reference test data based on the calculated similarity of each non-reference test data and are displayed respectively on independent coordinate axes, and pieces of non-reference test data that are not selected to be separately displayed are displayed together on the same coordinate axes. This allows displaying a plurality of graphs in an easily viewable manner with separately displaying graphs that are particularly relevant to and necessary for diagnosis.

Further, in the case where non-reference graphs that are similar to the reference graph are preferentially selected to be separately displayed, the user can perform diagnosis with comparing the graphs showing similar trends. Alternatively, in the case where non-reference graphs that are not similar to the reference graph are preferentially selected to be separately displayed, the user can find a trend of the test results unexpected by the user, and this may lead to detecting a complication, for example.

Still further, in the case where the display mode is switchable between the high similarity preferential display mode for preferentially selecting non-reference graphs having high similarities to be separately displayed and the low similarity preferential display mode for preferentially selecting non-reference graphs having low similarities to be separately displayed, an appropriate display of the graphs that suits the needs of the user can be achieved.

Yet further, in the case where the display set data structure that associates a disease with a group of medical test items is set in advance and medical test data of each medical test item of the display set data structure is displayed as a graph by specifying the disease, the number of graphs to be displayed can be limited and the resulting display of the graphs is more easily viewable.

DESCRIPTION OF THE PREFERRED EMBODIMENTS

Figure 1:
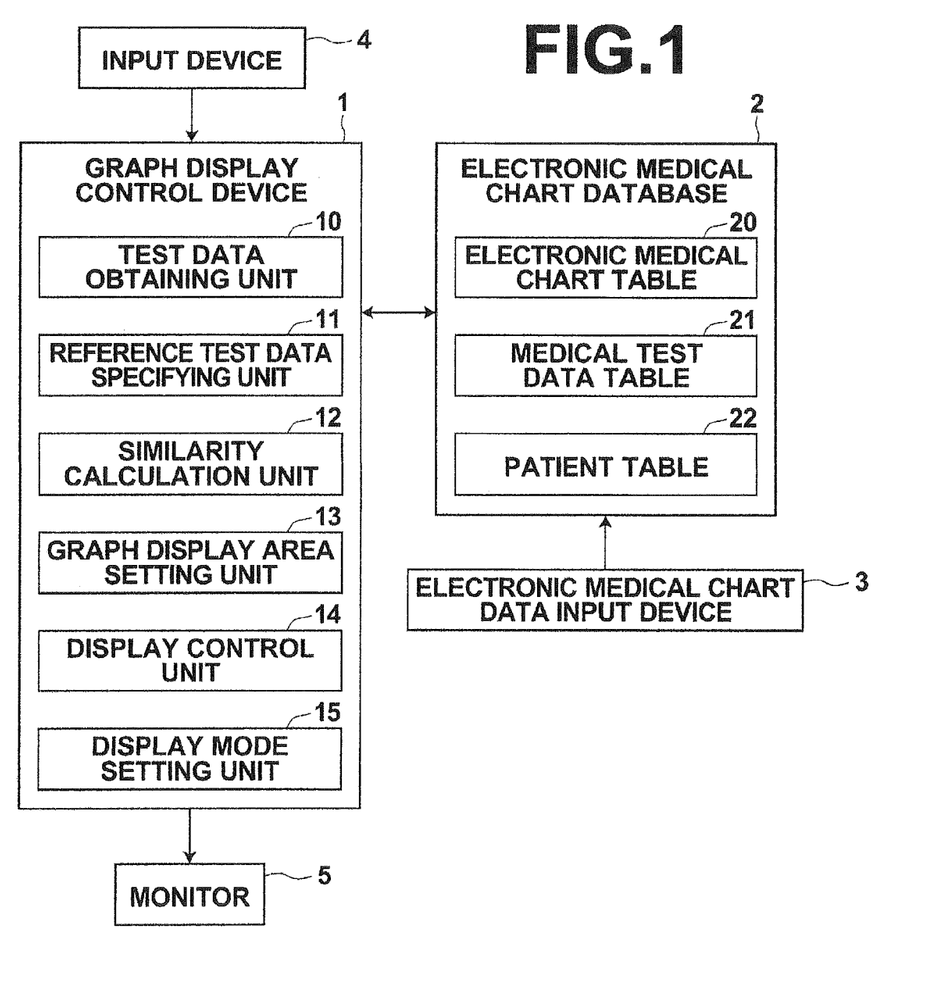
FIG. 1 is a block diagram illustrating the schematic configuration of an electronic medical chart display system employing one embodiment of a graph display control device of the present invention.

Hereinafter, an electronic medical chart display system employing one embodiment of a graph display control device, a graph display control method and a graph display control program of the present invention will be described in detail with reference to the drawings. FIG. 1 is a block diagram illustrating the schematic configuration of the electronic medical chart display system of this embodiment.

As shown in FIG. 1, the electronic medical chart display system of this embodiment includes a graph display control device 1, an electronic medical chart database 2, an electronic medical chart data input device 3, an input device 4 and a monitor 5.

First, the graph display control device 1 is described. As shown in FIG. 1, the graph display control device 1 includes a test data obtaining unit 10, a reference test data specifying unit 11, a similarity calculation unit 12, a graph display area setting unit 13, a display control unit 14 and a display mode setting unit 15.

The graph display control device 1 is implemented by a computer having the graph display control program according to one embodiment of the invention installed thereon. When the graph display control program is executed by the central processing unit (CPU), the test data obtaining unit 10, the reference test data specifying unit 11, the similarity calculation unit 12, the graph display area setting unit 13, the display control unit 14 and the display mode setting unit 15 function, and the test data obtaining unit 10 searches through the electronic medical chart database 2 to obtain a desired electronic medical chart and medical test data. The graph display control program may be recorded in a recording medium, such as a CD-ROM, or may be downloaded from a server, or the like, via the Internet.

The test data obtaining unit 10 obtains pieces of medical test data used to generate a plurality of graphs to be displayed on the monitor 5. Each medical test data is stored in the electronic medical chart database 2 with being associated with an electronic medical chart. The medical test data stored in the electronic medical chart database 2 will be described in detail later.

Then, the test data obtaining unit 10 searches for and obtains the medical test data to be displayed on the monitor 5 from a number of pieces of medical test data stored in the electronic medical chart database 2.

Figure 2:
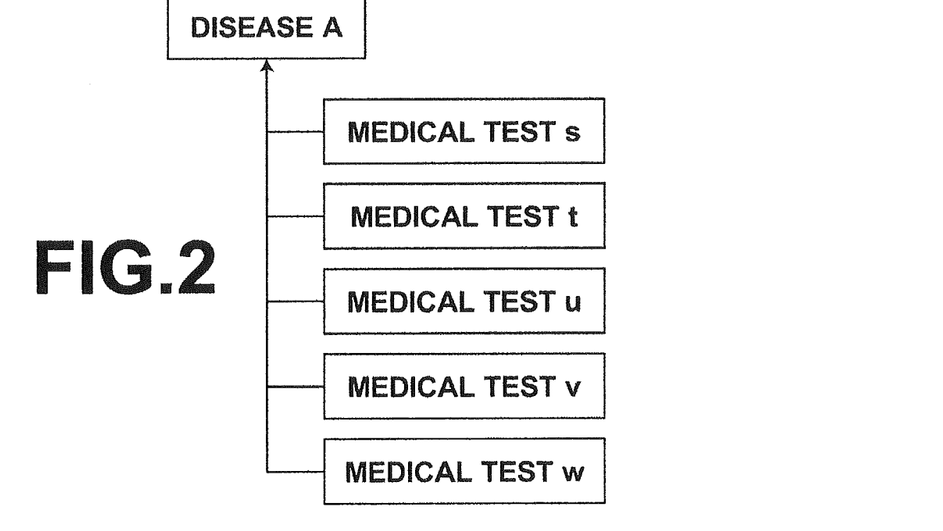
FIG. 2 is a diagram illustrating one example of a display set data structure that links a disease A to a group of medical test items.
Figure 3:
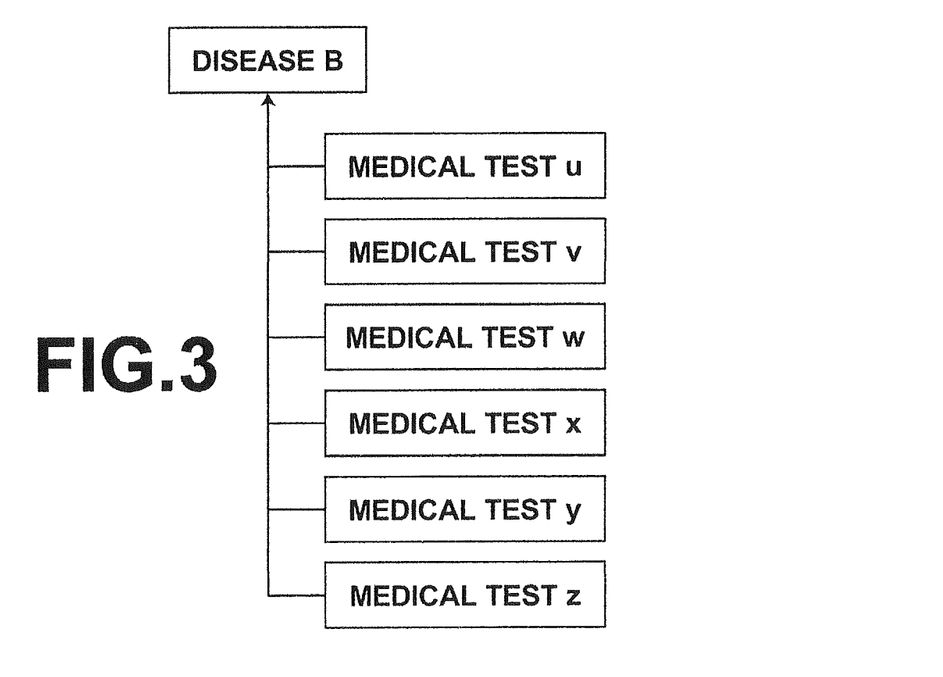
FIG. 3 is a diagram illustrating one example of a display set data structure that links a disease B to a group of medical test items.

Specifically, the test data obtaining unit 10 of this embodiment includes a plurality of display set data structures set in advance, each of which associates, for example, a given disease with a medical test item group including a plurality of medical test items necessary for diagnosis of the disease. FIG. 2 shows a display set data structure that associates a disease A with a medical test item group including medical test items s to w, and FIG. 3 shows a display set data structure that associates a disease B with a medical test item group including medical test items u to z. Basically, display set data structures for different diseases include different medical test item groups; however, some of display set data structures may share the same medical test items. The display set data structures shown in FIGS. 2 and 3 share the medical test items u to w.

Then, the test data obtaining unit 10 obtains information of a given disease inputted by the user via the input device 4, and references the display set data structure corresponding to the obtained disease to search for and obtain medical test data of each medical test item from a medical test data table 21 in the electronic medical chart database 2.

Further, the test data obtaining unit 10 of this embodiment obtains a search condition for searching for a given medical test data, and searches through the medical test data table 21 in the electronic medical chart database 2 based on the search condition to obtain the medical test data that meets the search condition. There are various search conditions, and examples thereof will be described in detail later.

The reference test data specifying unit 11 specifies reference test data from among the pieces of medical test data obtained by the test data obtaining unit 10. The specification of the reference test data may be achieved by the user specifying a piece of medical test data from among the pieces of medical test data via the input device 4, or a medical test item to be used as the reference test data may be set in advance in the display set data structure for each disease. Still alternatively, values of the pieces of medical test data may be checked and one including an abnormal value may be specified as the reference test data.

The similarity calculation unit 12 calculates a similarity of variation of each of at least two pieces of non-reference test data among the pieces of medical test data other than the reference test data obtained by the test data obtaining unit 10 relative to variation of the reference test data. The similarity calculation unit 12 in this embodiment calculates, as the similarity, a correlation coefficient between variation of numerical values along the sub-axis (vertical axis) of the reference test data relative to numerical values set along the main axis (horizontal axis) thereof and variation of numerical values along the sub-axis (vertical axis) of the non-reference test data relative to numerical values set along the main axis (horizontal axis) thereof.

Figure 4:
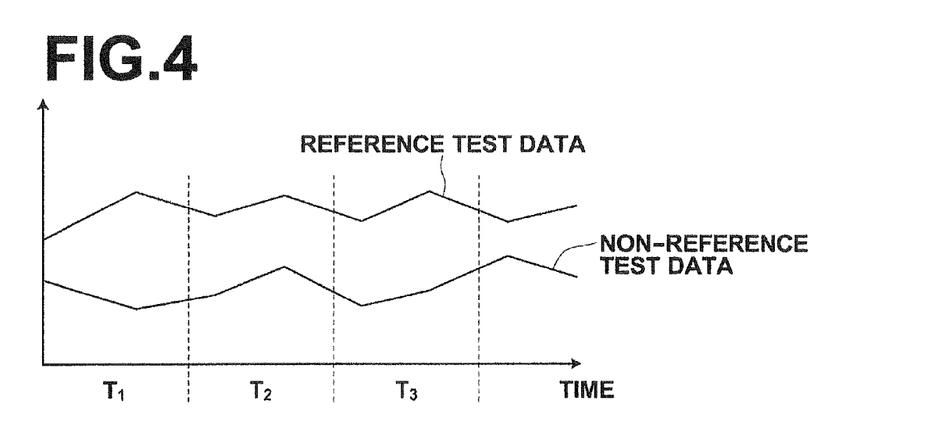
FIG. 4 is a diagram for explaining how a similarity of each non-reference test data to reference test data is calculated.

More specifically, as shown in FIG. 4, the similarity calculation unit 12 divides the main axis of the reference test data and the main axis of the non-reference test data into given zones Ti (zones $T_1$ to $T_3$ in the example shown in FIG. 4). If the main axis is a temporal axis, for example, each zone Ti is set to correspond to a week, a day, an hour, or the like. In a case where the main axis is not a temporal axis, each zone Ti is set to correspond to an appropriate unit for the content represented by the main axis. If the time, or the like, represented by the entire main axis varies among the reference test data and the pieces of non-reference test data, normalization in the main axis direction is performed to make the main axis of each non-reference test data conform to the main axis of the reference test data.

Then, the similarity between the variation of the reference test data and the variation of the non-reference test data in the zones Ti is calculated. At this time, variation of the numerical values along the sub-axis relative to the numerical values defined along the main axis is calculated. Specifically, a correlation coefficient "Correlation" of the non-reference test data to the reference test data is calculated according to the equation shown below:

$$\text{Correlation} = \Sigma(mj-E(m))(nj-E(n))/\sqrt{\{\Sigma(mj-E(m))^2\}\sqrt{\{\Sigma(nj-E(n))^2\}}},$$

where mj is each numerical value belonging to a set Mi of the reference test data in one of the zones Ti, nj is each numerical value belonging to a set Ni of each non-reference test data in the zone Ti, j is a scale unit of the horizontal axis, E(m) is an average of the numerical values mj, and E(n) is an average of the numerical values nj.

When the similarity is calculated as described above, or when non-reference graphs based on the pieces of non-reference test data are displayed together on the same coordinate axes, as described later, the unit of each piece of medical test data varies depending on the medical test item. Therefore, the display width along the sub-axis (vertical axis) of each graph may be normalized. The normalization may be achieved, for example, by making a difference between the maximum value and the minimum value of each piece of medical test data conform to a display width corresponding to 1.0.

Specifically, the normalization is achieved according to the equation below:

$$\text{norm}\_mj = 1.0/(m\_\max - m\_\min) \times mj$$

where m_max is the maximum value of medical test data values mj belonging to the set Mi, m_min is the minimum value of the medical test data values mj, and norm_mj is each medical test data value after the normalization.

It should be noted that, although the correlation coefficient is calculated as the similarity of each non-reference test data to the reference test data in this embodiment, this is not intended to limit the invention, and any other value may be calculated as the similarity. For example, a covariance may be calculated as the similarity, or increase and/or decrease of the medical test values calculated using first order differentiation may be used as the similarity.

When the similarity is calculated as described above, the values of the reference test data and each non-reference test data may directly be used, or the similarity may be calculated, for example, after converting the reference test data and each non-reference test data such that the medical trend shown by the reference test data and the medical trend shown by the non-reference test data can be understood in the same manner.

Specifically, for example, if a greater value of the reference test data shows a medically worse trend and a smaller value of the non-reference test data shows a medically worse trend, then, for example, each value of the reference test data and each value of the non-reference test data may be converted into a difference from a given reference value, and the similarity may be calculated between the difference values of the reference test data and the non-reference test data.

It should be noted that, although the similarity is calculated for the arbitrary zones Ti in the above description, the similarity may be calculated using numerical values along the entire main axes of the reference test data and the non-reference test data.

The graph display area setting unit 13 includes settings of a graph display area in a window displayed on the monitor 5.

Figure 5:
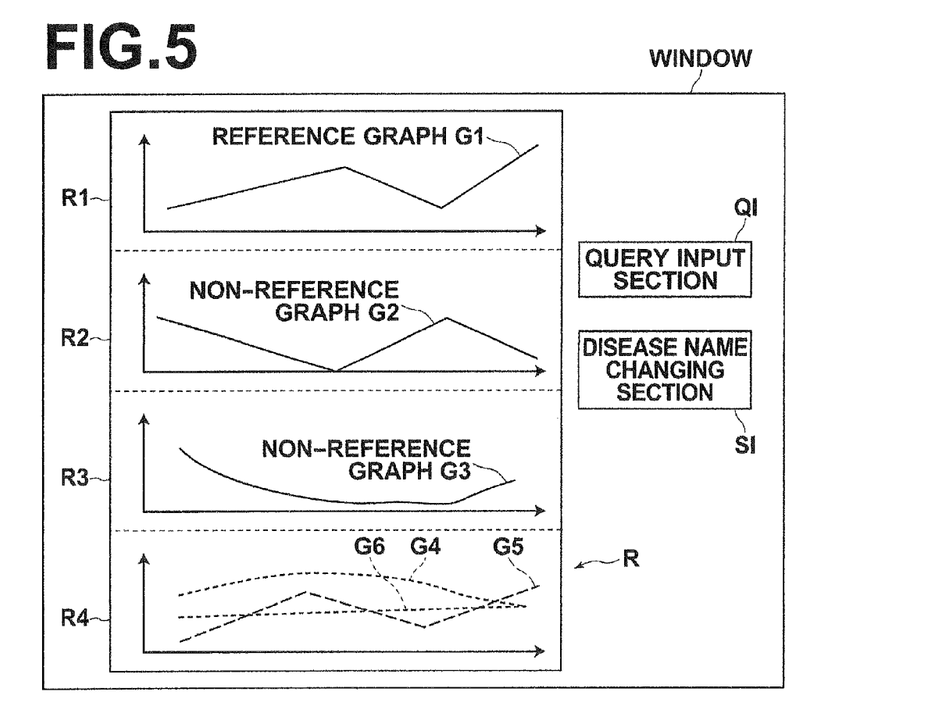
FIG. 5 is a diagram illustrating one example of a window displayed by the electronic medical chart display system shown in FIG. 1.

Specifically, a graph display area R, as shown in FIG. 5, is set. In the example shown in FIG. 5, four graph list display areas R1 to R4 are set. Graphs G1 to G6 to be displayed are assigned to the graph list display areas R1 to R4. Specifically, in this embodiment, the uppermost graph list display area R1 is assigned with a reference graph G1 based on the reference test data, the middle graph list display areas R2 to R3 are respectively assigned with non-reference graphs G2 to G3 based on the pieces of non-reference test data selected to be separately displayed by the display control unit 14, and the lowermost graph list display area R4 is assigned with non-reference graphs G4 to G6 based on the pieces of non-reference test data that are not selected to be separately displayed by the display control unit 14. How the non-reference test data to be separately displayed is selected by the display control unit 14 will be described in detail later.

Positions, widths and heights of the graph display area R and the graph list display areas R1 to R4 are set as appropriate by the user via the input device 4. The number of the graph list display areas may be set in advance or may be changed depending on the size of the window. Namely, if the size of the window is increased by the user, the number of the graph list display areas may be increased. In contrast, if the size of the window is reduced by the user, the number of the graph list display areas may be decreased. Along with the increase or decrease of the number of the graph list display areas, the number of the pieces of non-reference test data selected to be separately displayed by the display control unit 14 is also increased or decreased.

The graph display area setting unit 13 also includes setting of an upper limit value of the number of the non-reference graphs displayed in the lowermost graph list display area R4. The display control unit 14 plots the non-reference graphs of a number not greater than the upper limit that is set in the graph display area setting unit 13 on the same coordinate axes, as described later, to display the graphs in the graph list display area R4. The upper limit value may arbitrarily be changed by the user.

Further, the number of the non-reference graphs displayed in the lowermost graph list display area R4 may be changed when the size of the graph list display area R4 is changed by the user. Namely, if the size of the graph list display area R4 is increased by the user, the number of the displayed non-reference graphs may be increased. In contrast, if the size of the graph list display area R4 is reduced by the user, the number of the displayed non-reference graphs may be decreased.

The display control unit 14 displays the window on the monitor 5, as shown in FIG. 5, and displays the graphs G1 to G6 assigned to the graph list display areas R1 to R4 in the corresponding graph list display areas in the graph display area R in the window.

As shown in FIG. 5, the display control unit 14 of this embodiment displays the reference graph G1 based on the reference test data on the independent coordinate axes of the uppermost graph list display area R1.

With respect to the non-reference graphs G2 to G6 based on the pieces of non-reference test data, the display control unit 14 determines the graph list display area in which each non-reference graph is displayed based on the similarity of each non-reference test data.

Specifically, the display control unit 14 selects two pieces of non-reference test data to be separately displayed from the pieces non-reference test data based on the similarity of each non-reference test data, and displays each of the non-reference graphs G2 and G3 based on the two pieces of non-reference test data to be separately displayed on the independent coordinate axes in each of the middle graph list display areas R2 and R3. On the other hand, the display control unit 14 displays the non-reference graphs G4 to G6 based on the pieces of non-reference test data that are not selected to be separately displayed together on the same coordinate axes in the lowermost graph list display area R4. It should be noted that the number of the pieces of non-reference test data selected to be separately displayed, as described above, is not limited to two. In a case where there are three or more middle graph list display areas, the number of the pieces of non-reference test data selected to be separately displayed is increased depending on the number of the middle graph list display areas.

The determination as to whether or not each non-reference test data is separately displayed based on the similarity of the non-reference test data by the display control unit 14 of this embodiment, as described above, is performed based on a display mode set at the display mode setting unit 15. Specifically, if a high similarity preferential display mode is set at the display mode setting unit 15, for example, the piece of non-reference test data having relatively high similarity among the pieces of the non-reference test data is preferentially selected to be separately displayed. On the other hand, if a low similarity preferential display mode is set at the display mode setting unit 15, the piece of non-reference test data having relatively low similarity among the pieces of the non-reference test data is preferentially selected to be separately displayed.

The non-reference graphs G4 to G6 based on the pieces of non-reference test data that are not selected to be separately displayed are displayed together on the same coordinate axes, as shown in FIG. 5. At this time, the non-reference graphs G4 to G6 may be displayed with different levels of visibility based on the similarity of each non-reference test data.

Specifically, if the display mode set at the display mode setting unit 15 is the high similarity preferential display mode, the non-reference graph having a higher similarity may be displayed with a higher level of visibility. In contrast, if the display mode is the low similarity preferential display mode, the non-reference graph having a lower similarity may be displayed with a higher level of visibility.

The graph with a higher level of visibility herein refers to a graph that is displayed in a manner more readily recognizable by the user observing the graphs, i.e., in an emphasized display manner. For example, in a case where the non-reference graphs are displayed in monochrome (gray), the graph with a higher level of visibility may be displayed in higher density and the graph with a lower level of visibility may be displayed in lower density.

On the other hand, in a case where the non-reference graphs are displayed in color, the graph with a higher level of visibility may be displayed in a color having higher contrast with the background color, and the graph with a lower level of visibility may be displayed in a color having lower contrast with the background color. Alternatively, the graph with a higher level of visibility may be displayed in a color with higher intensity, and the graph with a lower level of visibility may be displayed in a color having lower intensity.

In a case where the non-reference graphs are displayed in the form of line graphs, the graph with a higher level of visibility may be displayed in a thicker line, and the graph with a lower level of visibility may be displayed in a thinner line. Alternatively, the graph with a higher level of visibility may be displayed in a solid line, and the graph with a lower level of visibility may be displayed in a dashed line.

As described above, the number of the non-reference graphs displayed in the lowermost graph list display area R4 has an upper limit. Therefore, if the display mode set at the display mode setting unit 15 is the high similarity preferential display mode, the non-reference graphs with relatively high similarities are preferentially displayed, or if the display mode set at the display mode setting unit 15 is the low similarity preferential display mode, the non-reference graphs with relatively low similarities are preferentially displayed.

It is desirable that the reference graph is displayed in a most emphasized manner with the highest level of visibility.

Positions, heights, widths, etc., of the graphs displayed by the display control unit 14 may be arbitrarily set by the user via the input device 4. Also, colors and line types of the lines of the graphs, and colors, fonts and font sizes of numerical values and texts provided along the axes of the graphs can be arbitrarily changed by the user. Colors of the graphs, the axes and the backgrounds can also be arbitrarily changed by the user.

The display control unit 14 also displays a query input section QI and a disease name changing section SI in the window, as shown in FIG. 5. The query input section QI receives an input of the search condition that is used when the test data obtaining unit 10 reads out the medical test data from the medical test data table 21 in the electronic medical chart database 2, as described above. The disease name changing section SI receives an input to change the disease name of the display set data structure. The test data obtaining unit 10 obtains the medical test data based on the search condition inputted via the query input section QI and the disease name inputted via the disease name changing section SI.

The display control unit 14 also displays, on the monitor 5, the content of an electronic medical chart specified by a given electronic medical chart ID and the content of a patient table, besides the graphs showing the medical test data.

The display mode setting unit 15 sets the display mode, which is switchable between the high similarity preferential display mode and the low similarity preferential display mode. The display mode is changed in response to an instruction by the user via the input device 4.

Next, the electronic medical chart database 2 is described. As shown in FIG. 1, the electronic medical chart database 2 includes an electronic medical chart table 20, the medical test data table 21 and a patient table 22.

Figure 6:
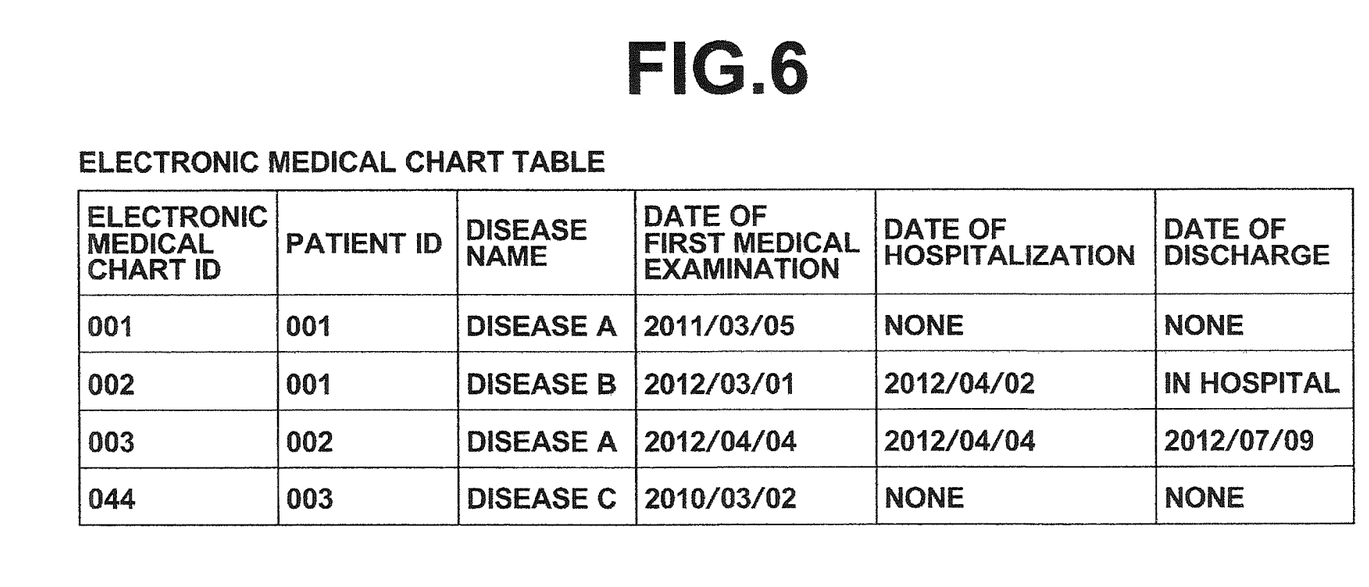
FIG. 6 is a diagram illustrating one example of an electronic medical chart table.

The electronic medical chart table 20 stores a number of electronic medical charts, each of which is identified by an electronic medical chart ID. As shown in FIG. 6, each electronic medical chart stores a patient ID of a patient, a date of medical examination of the patient, the name of a disease diagnosed in the medical examination, and a medical examination history of the patient, such as a hospitalization history.

Figure 7:
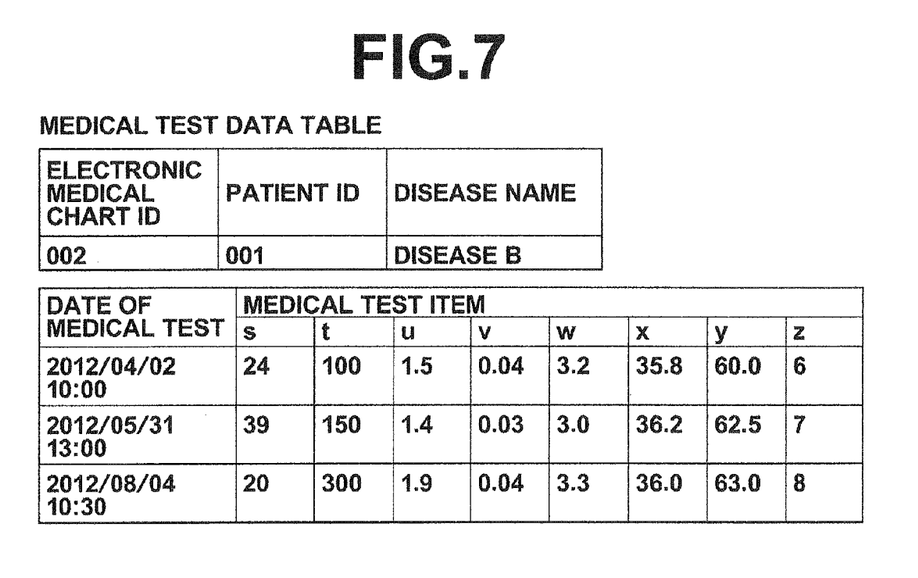
FIG. 7 is a diagram illustrating one example of a medical test data table.

The medical test data table 21 stores various types of medical test data associated with each electronic medical chart ID. As the medical test data linked to each electronic medical chart ID, all the medical test data obtained by medical tests performed during medical examinations on the patient who corresponds to the electronic medical chart that is identified by the electronic medical chart ID are stored with being linked to the electronic medical chart ID. FIG. 7 shows all the pieces of medical test data linked to an electronic medical chart ID "002", a patient ID "001" and a disease name "disease B". The pieces of medical test data shown in FIG. 7 are pieces of medical test data of medical test items s to z performed during medical examinations on the patient identified by the patient ID "001" having the disease B.

Figure 8:
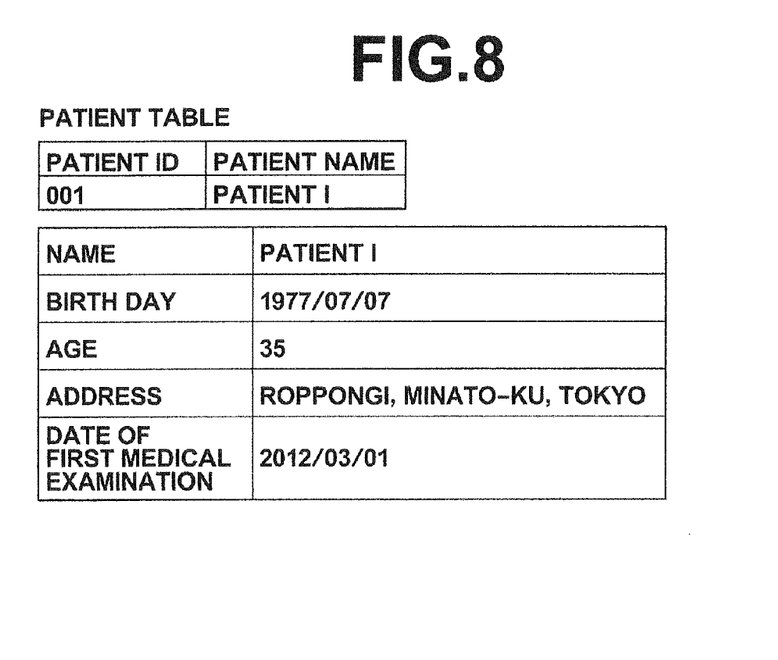
FIG. 8 is a diagram illustrating one example of a patient table.

The patient table 22 stores tables storing information relating to and associated with each patient, as shown in FIG. 8.

Each electronic medical chart stored in the electronic medical chart table 20, each medical test data stored in the medical test data table 21 and the patient table of each patient stored in the patient table 22 are managed with being linked to the electronic medical chart ID and the patient ID, and the medical examination information and the medical test data relating to a given patient corresponding to a given patient ID can be arbitrarily obtained by specifying the electronic medical chart ID or the patient ID.

An electronic medical chart data input device 3 is connected to the electronic medical chart database 2. The electronic medical chart data input device 3 is used to input a content to be contained in the electronic medical chart or the patient table, and to input the medical test data.

Figure 9:
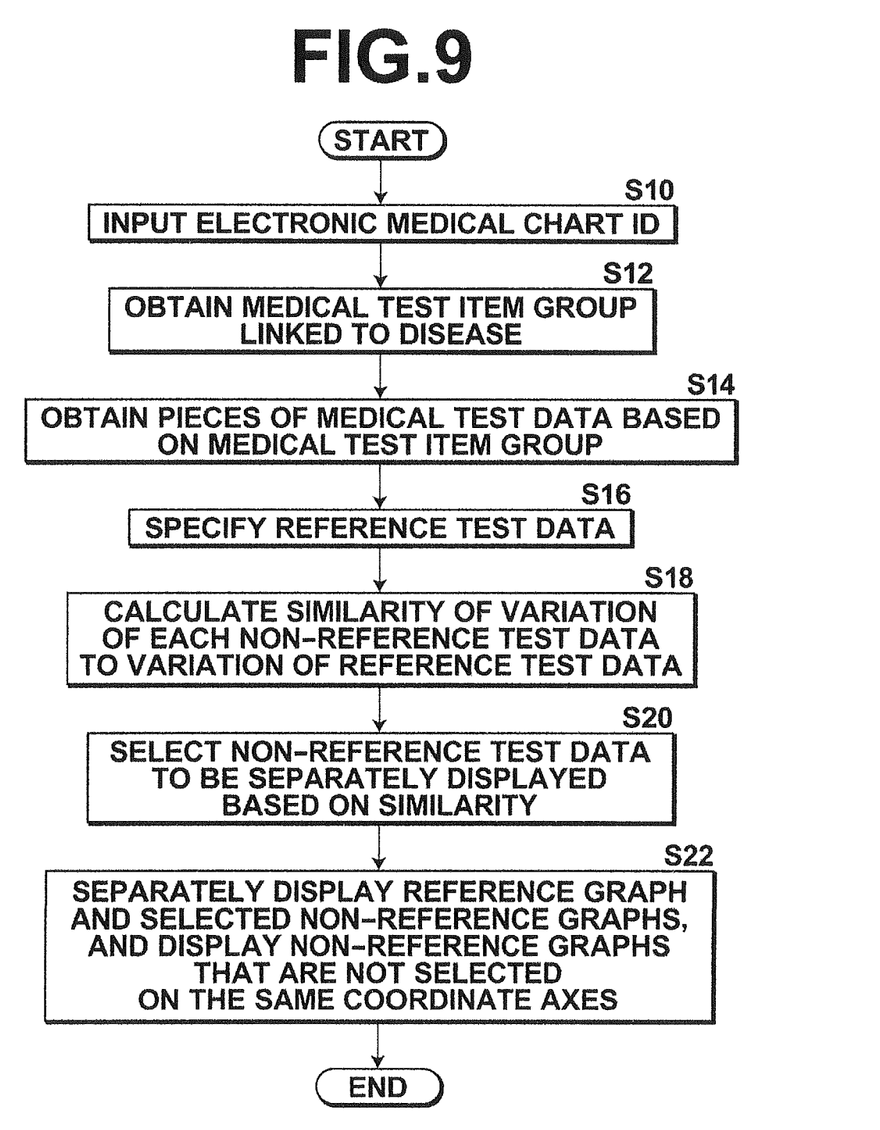
FIG. 9 is a flow chart for explaining operations of the electronic medical chart display system shown in FIG. 1 for displaying graphs of pieces of medical test data.

Next, operations of the electronic medical chart display system of this embodiment for displaying the graphs showing the medical test data is described with reference to the flow chart shown in FIG. 9.

First, an electronic medical chart ID corresponding to desired medical test data to be displayed is inputted via the input device 4, and the electronic medical chart ID is obtained by the test data obtaining unit 10 (S10). Based on the inputted electronic medical chart ID, the test data obtaining unit 10 references the electronic medical chart table 20 in the electronic medical chart database 2, and obtains the disease name linked to the electronic medical chart ID. Based on the disease name, the test data obtaining unit 10 references the display set data structure set in advance, and obtains a medical test item group linked to the disease in the display set data structure (S12). In this example, the disease name linked to the electronic medical chart ID is "disease B", and the test data obtaining unit 10 obtains the medical test items u to z linked to the "disease B" in the display set data structure shown in FIG. 3.

Then, the test data obtaining unit 10 references the medical test data table 21 in the electronic medical chart database 2, and searches for and obtains pieces of medical test data of the medical test items u to z linked to the disease B in the display set data structure among the pieces of medical test data of the medical test items s to z, which are recorded with being linked to the inputted electronic medical chart ID, from the medical test data table 21 (S14).

Then, the reference test data specifying unit 11 specifies the reference test data from among the pieces of medical test data obtained by the test data obtaining unit 10 (S16).

The reference test data and the pieces of non-reference test data other than the reference test data are inputted to the similarity calculation unit 12, and the similarity calculation unit 12 calculates the similarity of the variation of each non-reference test data to the variation of the reference test data based on the reference test data and the pieces of non-reference test data inputted thereto (S18).

Subsequently, the display control unit 14 selects the pieces of non-reference test data to be separately displayed based on the similarity of each non-reference test data (S20). In this example, the upper limit of the number of the non-reference graphs to be separately displayed is two, and the high similarity preferential display mode is set at the display mode setting unit 15. Namely, two non-reference graphs in the order of the similarity from the highest are selected as the non-reference graphs to be separately displayed.

Then, the display control unit 14 displays the reference graph G on the independent coordinate axes in the uppermost graph list display area R1, displays the non-reference graphs G2 and G3 to be separately displayed on the independent coordinate axes in the middle graph list display areas R2 to R3, respectively, and displays the non-reference graphs G4 to G6 that are not selected to be separately displayed together on the same coordinate axes in the lowermost graph list display area R4 (S22).

According to the electronic medical chart display system of the above-described embodiment, the similarity of the variation of each of the pieces of the non-reference test data to the variation of the reference test data is calculated, and the pieces of non-reference test data to be separately displayed are selected from the pieces of the non-reference test data based on the calculated similarity of each non-reference test data. The pieces of non-reference test data to be separately displayed are respectively displayed on independent coordinate axes, and the pieces of non-reference test data that are not selected to be separately displayed are displayed together on the same coordinate axes. This allows displaying a plurality of graphs in an easily viewable manner with separately displaying graphs that are particularly relevant to and necessary for diagnosis.

Further, in the case where non-reference graphs that are similar to the reference graph are preferentially selected to be separately displayed, the user can perform diagnosis with comparing the graphs showing similar trends. Alternatively, in the case where non-reference graphs that are not similar to the reference graph are preferentially selected to be separately displayed, the user can find a trend of the test results unexpected by the user, and this may lead to detecting a complication, for example.

Still further, in the case where the display mode is switchable between the high similarity preferential display mode for preferentially selecting non-reference graphs having high similarities to be separately displayed and the low similarity preferential display mode for preferentially selecting non-reference graphs having low similarities to be separately displayed, an appropriate display of the graphs that suits the needs of the user can be achieved.

It should be noted that, although the above-described operations for displaying the graphs is to display the graphs showing the pieces of medical test data linked to a given disease in the display set data structure for the disease recorded in a given electronic medical chart, the graphs displayed by the electronic medical chart display system of this embodiment are not limited to the above-described graphs.

For example, as the search condition for searching for medical test data, a given disease name may be inputted via the query input section QI in the above-described window, and the test data obtaining unit 10 may search for and obtain all the medical test data relating to all the patient IDs on all the electronic medical charts in which the disease name inputted via the query input section QI is recorded. Then, based on the obtained medical test data, the same operations as those described above may be performed to display the reference graph and the non-reference graphs. Namely, the reference graph is displayed in the uppermost graph list display area, and the non-reference graphs may be separately displayed on independent coordinate axes or displayed together on the same coordinate axes based on the similarity thereof.

Figure 10:
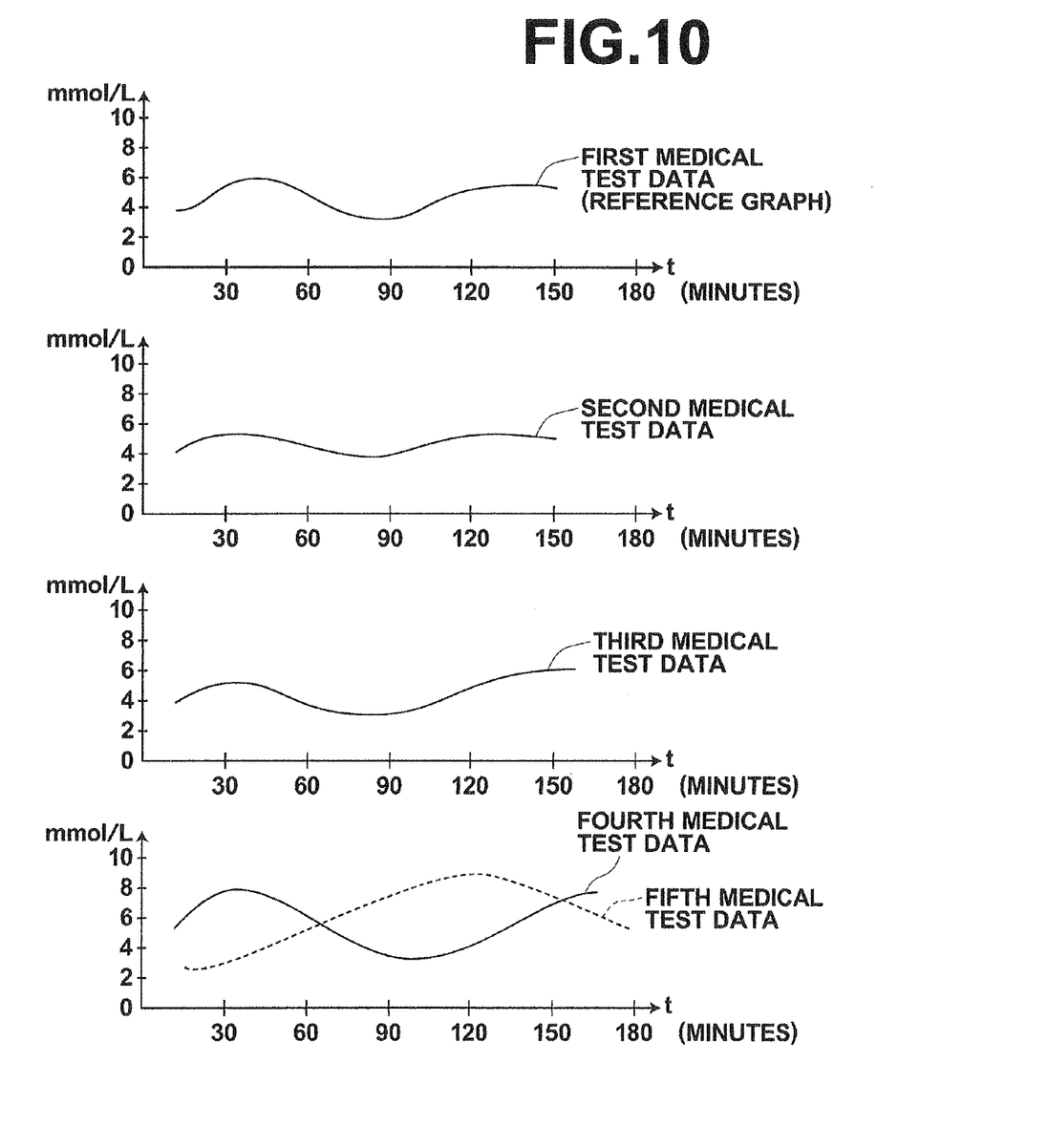
FIG. 10 is a diagram illustrating one example of graphs displayed by the electronic medical chart display system shown in FIG. 1.

Further, the test data obtaining unit 10 may search for and obtain medical test data of the same medical tests performed on a given patient at different times, and the obtained medical test data may be displayed. FIG. 10 shows an example where five pieces of medical test data of the same medical tests performed at different times are displayed. The graph based on the first medical test data is displayed as the reference graph in the uppermost graph list display area. The graphs based on the second to fifth medical test data are separately displayed in the middle graph list display areas or displayed together on the same coordinate axes of the lowermost graph list display area based on the similarity of each medical test data to the first medical test data. It should be noted that each medical test data shows a result of a component test where the amount of a target component is measured several times during a period of several hours after administration of a drug. By displaying the graphs as shown in FIG. 10, the condition of the patient over time after treatment can be monitored. It should be noted that the pieces of medical test data shown in FIG. 10 can also be obtained by inputting a search condition via the query input section QI.

Figure 11:
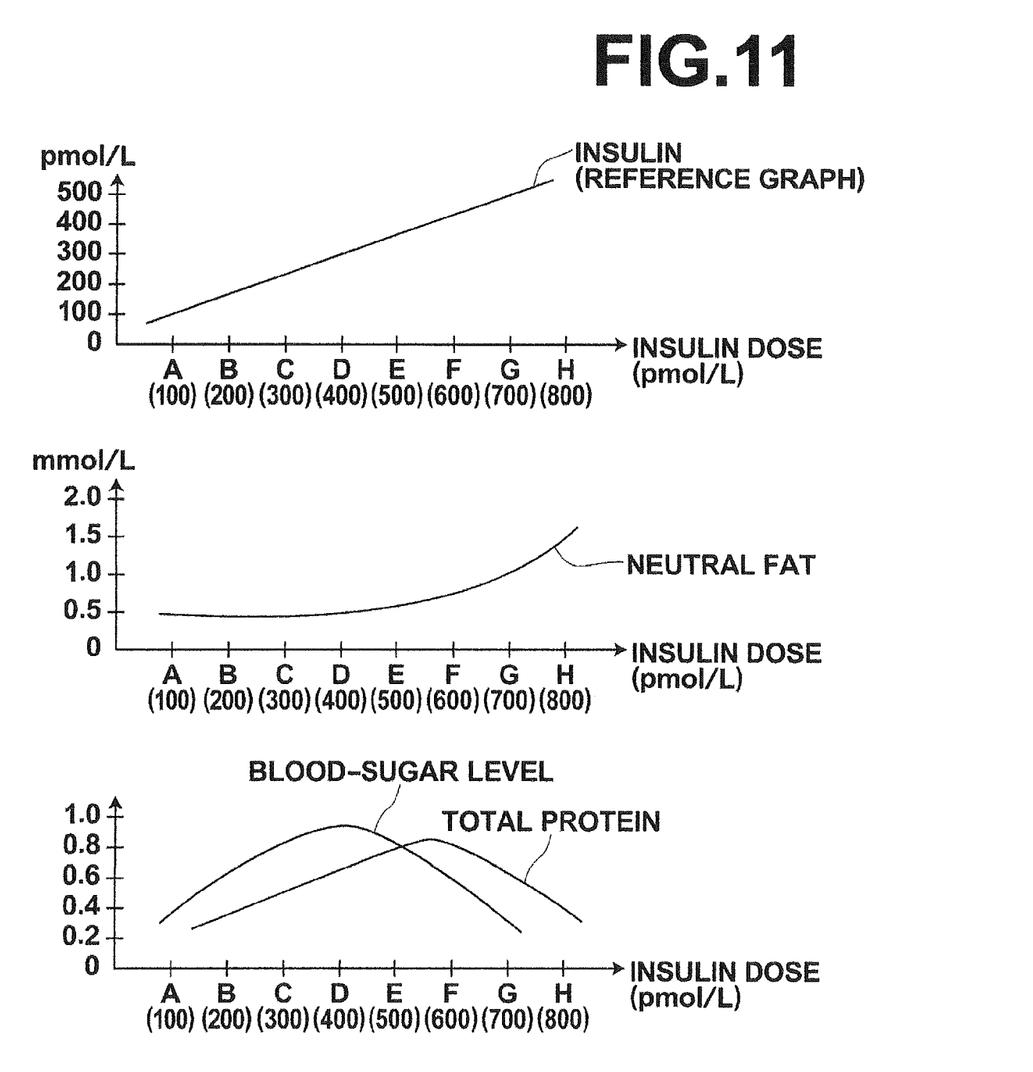
FIG. 11 is a diagram illustrating another example of graphs displayed by the electronic medical chart display system shown in FIG. 1.

While the graphs shown in FIG. 10 are graphs of medical test data with the main axis (horizontal axis) thereof being a temporal axis, the medical test data obtained by the test data obtaining unit 10 is not limited to medical test data with the main axis thereof being a temporal axis. For example, as shown in FIG. 11, insulin dose may plotted along the main axis, and a test result, such as insulin content, neutral fat, blood sugar level, $\gamma$-GTP, HDL cholesterol, or the like, in the blood relative to the insulin dose may be plotted along the sub-axis. In the example shown in FIG. 11, the graph of insulin content in the blood is displayed as the reference graph in the uppermost graph list display area, and the graphs based on other types of medical test data are separately displayed on the independent coordinate axes or displayed together on the same coordinate axes as the non-reference graphs.

Figure 12:
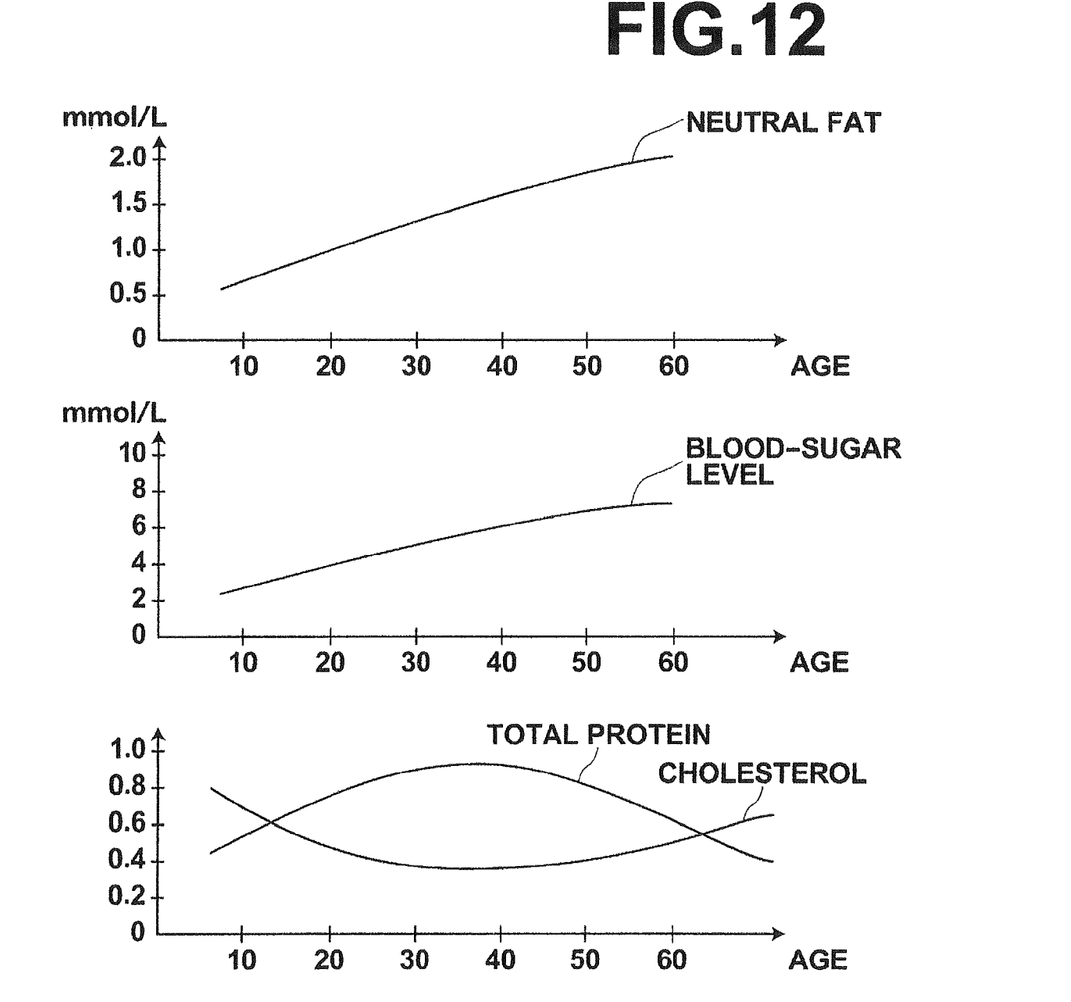
FIG. 12 is a diagram illustrating yet another example of graphs displayed by the electronic medical chart display system shown in FIG. 1.

Further, as shown in FIG. 12, ages of patients of different ages having the same disease may be plotted along the main axis, and the medical test data (neutral fat, blood sugar level, body weight, or the like) of the patients may be plotted along the sub-axis of each graph. By displaying such graphs, therapeutic effects obtained by long term treatments continued for several years can be simulated.

The medical test data as shown in FIGS. 11 and 12 can also be obtained by inputting various search conditions via the query input section QI.

What is claimed is:

1. A graph display control device comprising:
   a test data obtaining unit for obtaining pieces of medical test data used to generate a plurality of graphs;
   a reference test data specifying unit for specifying reference test data from among the pieces of medical test data obtained by the test data obtaining unit;
   a similarity calculation unit for calculating similarity of each non-reference graph based on at least three pieces of non-reference test data among the pieces of medical test data other than the reference test data to a reference graph based on the reference test data; and
   a display control unit for selecting a predetermined number of pieces of non-reference test data to be separately displayed from the at least three pieces of non-reference test data based on the similarity of each non-reference test graph calculated by the similarity calculation unit, displaying non-reference graphs based on the pieces of non-reference test data to be separately displayed respectively on independent coordinate axes, and displaying non-reference graphs based on the pieces of non-reference test data that are not selected to be separately displayed together on the same coordinate axes.

2. The graph display control device as claimed in claim 1, wherein the display control unit preferentially selects the non-reference test data having relatively high similarity as the non-reference test data to be separately displayed.

3. The graph display control device as claimed in claim 1, wherein the display control unit preferentially selects the non-reference test data having relatively low similarity as the non-reference test data to be separately displayed.

4. The graph display control device as claimed in claim 1, further comprising
a display mode setting unit for setting a display mode, the display mode being switchable between a high similarity preferential display mode for preferentially selecting the non-reference test data having relatively high similarity as the non-reference test graph to be separately displayed and a low similarity preferential display mode for preferentially selecting the non-reference test graph having relatively low similarity as the non-reference test data to be separately displayed,
wherein the display control unit selects the non-reference test graph to be separately displayed based on the high similarity preferential display mode or the low similarity preferential display mode set at the display mode setting unit.

5. The graph display control device as claimed in claim 1, wherein the test data obtaining unit searches for and obtains, based on a display set data structure that associates a disease with a group of medical test items, medical test data of each medical test item of the display set data structure from pieces of medical test data stored in advance.

6. The graph display control device as claimed in claim 1, wherein the test data obtaining unit obtains medical test data that is searched for based on a desired search condition from pieces of medical test data stored in advance.

7. The graph display control device as claimed in claim 1, wherein the display control unit displays the non-reference graphs that are displayed together on the same coordinate axes with different levels of visibility depending on the similarity.

8. The graph display control device as claimed in claim 1, wherein the test data obtaining unit obtains the pieces of medical test data linked to an electronic medical chart.

9. The graph display control device as claimed in claim 8, wherein the display control unit displays a content of the electronic medical chart.

10. The graph display control device as claimed in claim 1, wherein, selecting non-reference graphs to be individually displayed on individual coordinate axes and non-reference graphs to be displayed together on the same coordinate axes based on similarity is an integrated feature in the display control unit.

11. A graph display control method, comprising:
obtaining pieces of medical test data used to generate a plurality of graphs;
specifying reference test data from among the obtained pieces of medical test data;
calculating similarity of each non-reference graph based on at least three pieces of non-reference test data among the pieces of medical test data other than the reference test data to a reference graph based on the reference test data; and
selecting a predetermined number of pieces of non-reference test data to be separately displayed from the at least three pieces of non-reference test data based on the calculated similarity of each non-reference test graph, displaying non-reference graphs based on the pieces of non-reference test data to be separately displayed respectively on independent coordinate axes, and displaying non-reference graphs based on the pieces of non-reference test data that are not selected to be separately displayed together on the same coordinate axes.

12. A non-transitory recording medium containing a graph display control program for causing a computer to execute the steps comprising:
obtaining pieces of medical test data used to generate a plurality of graphs;
specifying reference test data from among the obtained pieces of medical test data;
calculating similarity of each non-reference graph based on at least three pieces of non-reference test data among the pieces of medical test data other than the reference test data to a reference graph based on the reference test data; and
selecting a predetermined number of pieces of non-reference test data to be separately displayed from the at least three pieces of non-reference test data based on the calculated similarity of each non-reference test graph, displaying non-reference graphs based on the pieces of non-reference test data to be separately displayed respectively on independent coordinate axes, and displaying non-reference graphs based on the pieces of non-reference test data that are not selected to be separately displayed together on the same coordinate axes.

* * * * *